United States Patent
Karanam et al.

(10) Patent No.: US 10,915,367 B1
(45) Date of Patent: Feb. 9, 2021

(54) EXECUTING COMPUTING MODULES USING MULTI-CORING

(71) Applicant: Capital One Services, LLC, McLean, VA (US)

(72) Inventors: Sravankumar Karanam, Frisco, TX (US); Ryan M. Parker, Dallas, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/519,190

(22) Filed: Jul. 23, 2019

(51) Int. Cl.
*G06F 9/46* (2006.01)
*G06F 9/50* (2006.01)

(52) U.S. Cl.
CPC ........... *G06F 9/505* (2013.01); *G06F 9/5055* (2013.01)

(58) Field of Classification Search
CPC .............................. G06F 9/505; G06F 9/5055
See application file for complete search history.

(56) References Cited

U.S. PATENT DOCUMENTS

| | | | |
|---|---|---|---|
| 6,445,829 B1* | 9/2002 | Shyu | G06F 17/147 382/233 |
| 9,672,188 B2 | 6/2017 | Vorbach | |
| 9,912,549 B2 | 3/2018 | Rieke | |
| 10,275,502 B2 | 4/2019 | Hubmann et al. | |
| 10,275,778 B1 | 4/2019 | Maag et al. | |
| 10,305,758 B1 | 5/2019 | Bhide et al. | |
| 2010/0161508 A1 | 6/2010 | Planitzer et al. | |
| 2011/0047525 A1* | 2/2011 | Castellanos | G06F 9/4494 717/104 |
| 2014/0331277 A1 | 11/2014 | Frascadore et al. | |
| 2016/0072831 A1 | 3/2016 | Rieke | |
| 2017/0249644 A1 | 8/2017 | DiMaggio et al. | |
| 2017/0251013 A1 | 8/2017 | Kirti et al. | |
| 2017/0302586 A1* | 10/2017 | Suchter | G06F 9/5038 |
| 2018/0027006 A1 | 1/2018 | Zimmermann et al. | |
| 2018/0103014 A1* | 4/2018 | Birger | H04L 63/045 |
| 2018/0300829 A1 | 10/2018 | Crabtree et al. | |
| 2018/0375892 A1 | 12/2018 | Ganor | |
| 2019/0052602 A1 | 2/2019 | Abraham et al. | |
| 2019/0073138 A1* | 3/2019 | Kavanagh | G06F 3/0611 |
| 2019/0220311 A1* | 7/2019 | Zhao | G06F 9/4887 |

OTHER PUBLICATIONS

"MapReduce", Jan. 10, 2017, Wikipedia (Year: 2017).*

* cited by examiner

*Primary Examiner* — Bradley A Teets
(74) *Attorney, Agent, or Firm* — Sterne, Kessler, Goldstein & Fox P.L.L.C.

(57) ABSTRACT

Described herein is a system for executing a computing module. Described herein is a system for executing a computing module. The system may determine whether a function of a computing module is suitable to be executed using multi-coring. The system identifies one or more available computing cores and executes the function on the one or more available computing cores. The one or more available computing cores can be dedicated to execute the function until the execution of the function is complete. The one or more available computing cores execute the tasks of the function asynchronously. The system receives output data from the function asynchronously in a list data structure. The system can maintain a desired order of the output data in the list data structure.

19 Claims, 7 Drawing Sheets

EXECUTING COMPUTING MODULES USING MULTI-CORING

BACKGROUND

Large entities such as financial institutions, retail stores, educational institutions, government agencies, and/or the like may electronically process large amounts of data and execute large amounts of calculations on a daily basis. Events such as natural disasters, updated regulations, power outages, and/or the like can cause a sudden influx in the data (e.g., customer complaints, questions, usage of a mobile application, and/or the like) that needs to be processed and the calculations needed to be executed. These entities may implement computing modules including multiple functions to process the large amounts of data and execute the large amounts of calculations. The functions include code or a set of instructions written in a programming language. The functions may execute a specified set of tasks. Each function may process data, execute calculations, and make function calls. Heavy computations that are not serializable and take large amounts of time can use large amounts of computational resources, and cause bottlenecks and network latency. Certain functions may take hours or days to complete due to millions of records and large amounts of calculations to be executed. Conventionally, entities would have to wait to execute computationally expensive functions when the usage of computer resources and the network is at a minimum. This can be inefficient as functions may need to be executed at any time of the day.

BRIEF DESCRIPTION OF THE FIGURES

The accompanying drawings, which are incorporated herein and form part of the specification, illustrate the present disclosure and, together with the description, further serve to explain the principles of the disclosure and enable a person skilled in the relevant art to make and use the disclosure.

The drawing in which an element first appears is typically indicated by the leftmost digit or digits in the corresponding reference number. In the drawings, like reference numbers may indicate identical or functionally similar elements.

DETAILED DESCRIPTION

Described herein is a system for executing a computing module. The system may determine whether a function of a computing module is suitable to be executed using multi-coring. That is the system determines whether a function is suitable to be executed by one or more computing cores in a dedicated fashion. The system identifies one or more available computing cores and executes the function on the one or more available computing cores. The one or more available computing cores can be dedicated to execute the function until the execution of the function is complete. For purposes of saving time and efficiency, the one or more available computing cores executes the tasks of the function asynchronously. The system receives output data from the function asynchronously in a list data structure. It can be appreciated that the output data may also be received as an array, stack, queue, and/or the like, but the output data will be discussed as a list throughout for the purposes of example, and not limitation. The system can maintain a desired order of the output data in the list data structure. Once the function has executed, the system converts the list data structure into a data frame data structure by transposing the data from the list data structure into the data frame data structure in the desired order.

The system solves the technical problem of network bottlenecks and network latency by dedicating computing cores to execute specific functions. In this configuration, other computing cores are available to execute other functions. Additionally, the system can quickly execute the functions by asynchronously executing the tasks of the function while maintaining the desired order of the output of the function.

Figure 1:
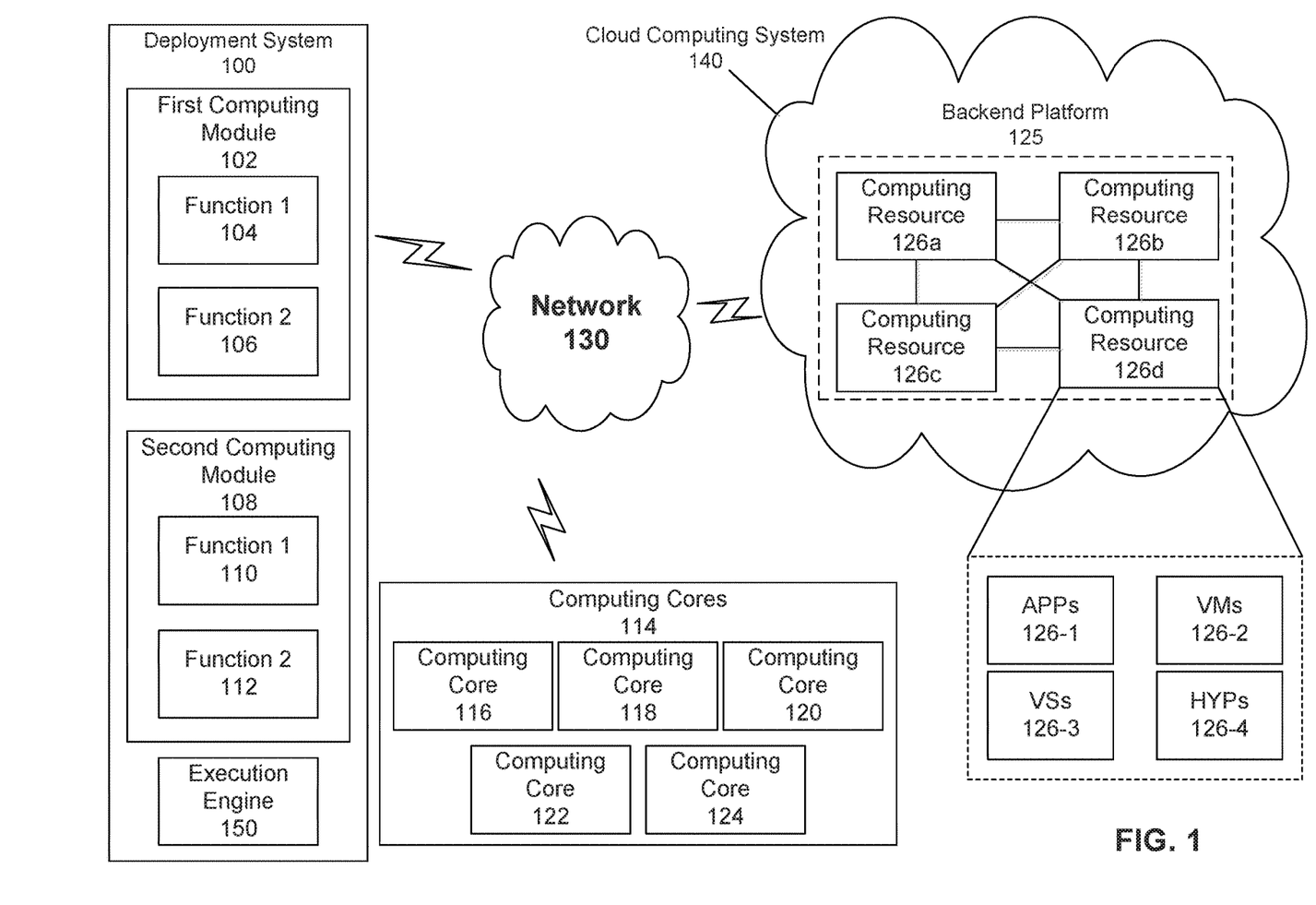
FIG. 1 is a block diagram of an example environment in which systems and/or methods for executing a computing module may be implemented according to an example embodiment.

FIG. 1 is a block diagram of an example environment 100 in which systems and/or methods described herein may be implemented. The environment 100 may include a deployment system 100. The deployment system 100 may include a first computing module 102 and a second computing module 108. The first computing module 102 may include function 1 104 and function 2 106. The second computing module 108 may include function 1 110 and function 2 112. Environment 100 may further include computing cores 114. Computing cores 114 may be a pool of computing cores which includes several individual computing cores such as computing core 116, computing core 118, computing core 120, computing core 122, and computing core 124. The devices of the environment 300 may be connected through wired connections, wireless connections, or a combination of wired and wireless connections.

In an example embodiment, one or more portions of the network 130 may be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

The backend platform 125 may include a server or a group of servers. In an embodiment, the backend platform 125 may be hosted in a cloud computing environment 140. It may be appreciated that the backend platform 125 may not be cloud-based, or may be partially cloud-based.

The cloud computing environment 140 includes an environment that delivers computing as a service, whereby shared resources, services, etc. The cloud computing environment 140 may provide computation, software, data access, storage, and/or other services that do not require end-user knowledge of a physical location and configuration of a system and/or a device that delivers the services. The cloud computing system 140 may include computer resources 126a-d.

Each computing resource 126a-d includes one or more personal computers, workstations, computers, server devices, or other types of computation and/or communication devices. The computing resource(s) 126a-d may host the backend platform 125. The cloud resources may include compute instances executing in the cloud computing resources 126a-d. The cloud computing resources 126a-d may communicate with other cloud computing resources 126a-d via wired connections, wireless connections, or a combination of wired or wireless connections.

Computing resources 126a-d may include a group of cloud resources, such as one or more applications ("APPs") 126-1, one or more virtual machines ("VMs") 126-2, virtualized storage ("VS") 126-3, and one or more hypervisors ("HYPs") 126-4.

Application 125-1 may include one or more software applications that may be provided to or accessed by the user device 140. In an embodiment, the application 204 may execute locally on the user device 140. Alternatively, the application 126-1 may eliminate a need to install and execute software applications on the user device 140. The application 126-1 may include software associated with backend platform 125 and/or any other software configured to be provided across the cloud computing environment 140. The application 126-1 may send/receive information from one or more other applications 126-1, via the virtual machine 126-2.

Virtual machine 126-2 may include a software implementation of a machine (e.g., a computer) that executes programs like a physical machine. Virtual machine 126-2 may be either a system virtual machine or a process virtual machine, depending upon the use and degree of correspondence to any real machine by virtual machine 126-2. A system virtual machine may provide a complete system platform that supports execution of a complete operating system (OS). A process virtual machine may execute a single program and may support a single process. The virtual machine 126-2 may execute on behalf of a user (e.g., user device 140) and/or on behalf of one or more other backend platforms 125, and may manage infrastructure of cloud computing environment 140, such as data management, synchronization, or long duration data transfers.

Virtualized storage 126-3 may include one or more storage systems and/or one or more devices that use virtualization techniques within the storage systems or devices of computing resources 126a-d. With respect to a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how administrators manage storage for end users. File virtualization may eliminate dependencies between data accessed at a file level and location where files are physically store. This may enable optimization of storage use, server consolidation, and/or performance of non-disruptive file migrations.

Hypervisor 126-4 may provide hardware virtualization techniques that allow multiple operations systems (e.g., "guest operating systems") to execute concurrently on a host computer, such as computing resources 126a-d. Hypervisor 126-4 may present a virtual operating platform to the guest operating systems, and may manage the execution of the guest operating systems multiple instances of a variety of operating systems and may share virtualized hardware resource.

In an embodiment, first computing module 102 includes function 1 104 and function 2 106. Second computing module 108 includes function 1 110 and function 2 112. Function 1104, function 2 106, function 1 110, and function 2 112, may be code programmed in a programming language such as Python, Java, C++, C, C #, and/or the like. The code may be instructions to complete a set of tasks. Function 1104, function 2 106, function 1 110, and function 2 112 may process data, execute calculations and return data when executed. Each of the first and second computing module 102, 108 may be programmed to execute various tasks. Function 1 104 and function 2 106 may execute the tasks to be completed by first computing module 102. Function 1 110, and function 2 112 may execute the various tasks to be executed by second computing module 108.

As a non-limiting example, first computing module 102 may be programmed to detect words or phrases from audio, video, and/or text files. Second computing module 108 may be programmed to generate reports based on the detected words or phrases from the audio, video, and/or text files. Accordingly, function 1 104 and function 2 106 of first computing system 102 may individually or together execute the tasks necessary for detecting words or phrases from audio, video, and/or text files. Function 1 110 and function 2 112 of the second computing module 108 may individually or together execute the tasks necessary to generate a report based on the detected words or phrases from the audio, video, and/or text files. Each function may require different arguments.

Continuing with the earlier example, function 2 106 may be responsible for generating or retrieving the audio, video, and/or text files. Function 2 106 may call function 1 104 and provide the audio, video, and/or text files as arguments. Function 1 104 may be responsible for detecting the words or phrases from the audio, video, and/or text files received as arguments from function 2 106.

Computing cores 114 may be a pool of computing cores 116-124. Computing cores 116-124 may be separate processing units configured to execute functions of the first and second computing modules 102, 108. Computing cores 116-124 may execute on one or more processors. Computing cores 116-124 may execute independently or in combination with one another. Computing cores 114 may be part of the cloud computing system 140. Alternatively, computing cores 114 may be separate from the cloud computing system 140.

Deployment system 100 may be configured to determine whether a function of the first and second computing modules 102, 108 is suitable executing using multi-coring or multiprocessing. Multi-coring is the concept using dedicated cores to execute a single function. For the purposes of speed and efficiency, multi-coring may be executed asynchronously. In this regard, using multi-coring, the tasks of a function may be executed in an asynchronous order. Multiprocessing includes the running of two or more programs or sequences of instructions simultaneously by a computer with more than one central processor. Using multiprocessing, deployment system 100 may execute the functions of the first and second computing modules 102, 108 using any one of the computing cores 116-124. In multi-coring one or more cores may be dedicated to only execute a single function. In multiprocessing any one of the computing cores may execute multiple functions in parallel or serially.

Deployment system 100 may determine whether a function is suitable for multi-coring or multiprocessing based on a series of steps. Initially, deployment system 100 may determine whether the code included in the function to be executed is computationally expensive. Deployment system 100 may determine the code is computationally expensive to execute based on an expected amount data to be processed by the code multiplied by an expected amount of calculations to be executed by the code. In response to determining the expected amount data to be processed by the code multiplied by the expected amount of calculations to be executed by the code is more than a threshold amount, the deployment system 100 may determine the code is computationally expensive. In response to determining code is not computationally expensive, deployment system may determine if the function is not suitable for multi-coring, as it may not be desirable to dedicate a set of resources to a function that is not computationally expensive to execute.

Next, deployment system 100 may determine whether the code of the function includes calculations that are interdependent of each other. As described above, using multi-coring, the tasks of a function may be executed asynchronously. Accordingly, in the event a function includes calculations which are dependent on other calculations, multi-coring may not be suitable for this function as the calculations may be executed out of the desired order. Likewise, deployment system 100 also determines whether the function has interdependences with other functions within the computing module. Multi-coring may not be suitable for a function in situations where the function is relying on other function calls, as the tasks of the function are executed asynchronously.

Next, deployment system 100 determines whether a computing module (i.e., first and second computing module 102, 108) has more than one function which is computationally expensive. Multi-coring may not be suitable for computing modules in which more than one function is computationally expensive as it may not be desirable to dedicate a large amount of computing cores to execute each computationally expensive function.

In the event deployment system 100 determines the code of the function is computationally expensive, does not include interdependent calculations, does not have interdependencies with other functions, and the computing module does not include more than one computationally expensive function, the deployment system 100 may determine the function may be suitable for multi-coring. Otherwise the deployment system 100 may determine the function is not suitable for multi-coring but rather is suitable for multiprocessing.

In the event a function is suitable for multi-coring, execution engine 150 may determine an amount of available computing cores. Execution engine 150 may determine the amount of computing cores necessary to execute the function. Execution engine 150 may assign the amount of computing cores from the available computing cores to execute the function. The assigned computing cores may execute the function and may not execute any other function until the function has completely executed. Execution engine 150 may execute the function on the assigned computing cores. In a non-limiting example, multi-coring may be implemented using Python which may include a global interpreter lock. The global interpreter lock is a mutex or a lock that allows only one computing core to be dedicated to execute the function.

As the assigned computing cores execute the function asynchronously, the function may return data asynchronously. Execution engine 150 may receive the data from the function and store the data in a list data structure rather than a data frame data structure. In this regard, execution engine 150 can ensure a desired order of the data is maintained even though the data may be received out of order. As an example, in the event a function is configured to execute task 1, task 2, and task 3. The assigned computing cores may execute the tasks in the following order: task 2, task 3, and task 1, leading to return data from each of these tasks out of order. It may be desirable to maintain the order of returned data from task 1, task 2, and task 3. Accordingly, execution engine 150 may maintain the order of the returned data in the list data structure as follows: [returned value from task 1, returned value from task 2, and returned value from task 3]. Execution engine 150 may transpose the list data structure into a data frame data structure, once the function has completely executed.

Once the assigned computing cores have completed the execution of the function using multi-coring, the assigned computing cores may be deemed available for selection again.

In the event deployment system 100 determines a function is suitable for multiprocessing, the execution engine may assign the function to a process and execute the process. The process may be executed by any one of the available computing cores.

Figure 2:
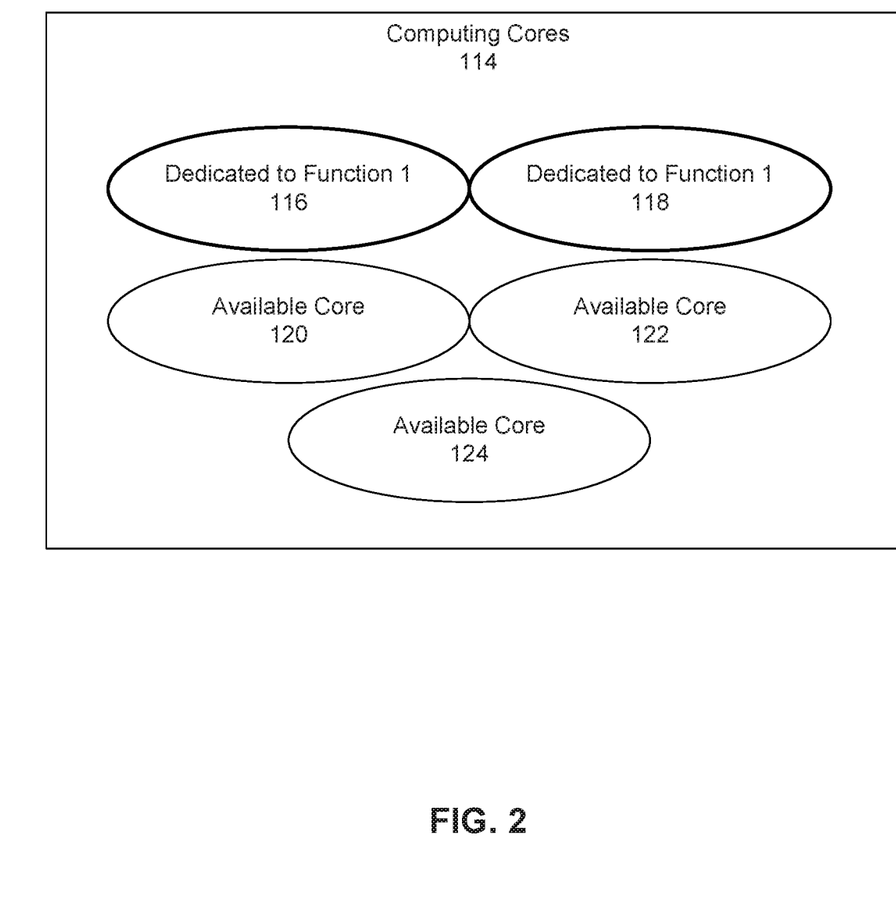
FIG. 2 illustrates example computing cores according to an embodiment.

With reference to FIG. 2, example computing cores according to an embodiment are illustrated. FIG. 1 and FIG. 2 will be described concurrently. As described above, computing cores 114 is a pool of computing cores 116-124. Each of the computing cores 116-124 may be configured to either execute multiple functions or may be instructed to be dedicated to execute a single function.

As a non-limiting example, deployment system 100 may be implemented in a financial institution or retail environment. First computing module 102 may be configured to detect customer complaints received via email, telephone, short messaging service (SMS), websites, web based applications, and/or the like. In the event of a natural disaster or power outage customer complaints may sharply increase and the influx of data to be processed may also increase.

Function 1 104 of the first computing module 102 may be tasked to detect and collect specified words or phrases in the customer complaints which may increase drastically based on the influx in incoming data. Function 1 104 may return the detected specified words or phrases in a data frame data structure. Due to the influx of incoming data, deployment system 100 may determine whether Function 1 104 is suitable for using multi-coring.

Deployment system 100 may determine that due to the influx of large amounts of data to be processed by function 1 104, the amount of data to be processed multiplied by the calculations to be performed by function 104 will be greater than a threshold amount making it computationally expensive. Deployment system 100 may determine the calculations executed by function 1 104 are not interdependent on each other and function 1 104 is not interdependent of other functions in the first or second computing modules 102, 108. Deployment system 100 may also determine that function 2 106 of the first computing module is not computationally expensive to execute based on an expected amount of data to be processed multiplied an expected number of calculations to be executed. Accordingly, deployment system 100 may determine function 1 104 is suitable for multi-coring.

Deployment system 100 may determine computing cores 116-124 are available. Deployment system 100 may determine that two computing cores are necessary to execute function 1 104. Execution engine 150 may assign computing core 116 and 118 to execute function 1 104, as described above. As a non-limiting example, when executing multi-coring in Python, a collect_df function can be programmed using a df.values.tolist( ) function so that function 1 104 does not directly return a data frame data structure rather the values returned from function 1 104 are collected in a list data structure. The df.values.tolist( ) function converts a data frame data structure into a list data structure. In this regard, the collect_df function receives the output data as the data frame data structure function 1 104 is configured to output and converts the data frame data structure into a list data structure.

Execution engine 150 may execute the function on computing cores 116 and 118 by instructing the assigned computing cores 116 and 118 to execute function 1 104 using the arguments required to execute function 1 104. Additionally, execution engine 150 may call a function (i.e., collect_df) to receive the output data of function 1 104 as a list data structure. As an example, while executing multi-coring using Python, execution engine 150 can execute function on computing cores 116 and 118 by executing the following call: pool.apply_async(funct1, args=(x,y,z), callback=collect_df). Pool represents the assigned computing cores 116-118 dedicated to execute function 1 104. Apply_async instructs computing cores 116-118 to execute the tasks of function 1 104 asynchronously. Funct1 may represent function 1 104. Args=(x,y,z) represent the arguments required to execute function 1 104. Callback represents a list data structure configured to receive data from function 1 104 using the collect_df function.

Execution engine 150 may collect the data frame data structure returned by function 1 104 in a list data structure using the collect_df function. Execution engine 150 may convert the callback list data structure into a data frame data structure at the completion of the execution of function 1 104 by transposing the data in the callback list data structure into a data frame data structure. Once the execution of function 1 104 is completed, computing cores 116-118 can be deemed available again and eligible for executing different functions.

Deployment system 100 may determine function 2 106 of first computing module 102 and function 1 110 and function 2 112 of second computing module 108 may be executed using multi-processing. Accordingly, execution engine 150 may assign each of the function 1 106 and function 1 and 2 110, 112 to a process. The processes may be structured as follows P1=Process(target=function 2 106, args( )); P2=Process(target=function 1 110, args( )); P3=Process (target=function 2 112, args( )). The args ( ) represent arguments required by each of the functions. The processes may be executed in parallel using any one of the available computing cores 120-124 other than the computing cores 116-118 dedicated to execute function 1 104. Each of the processes may be initiated in parallel.

Figure 3:
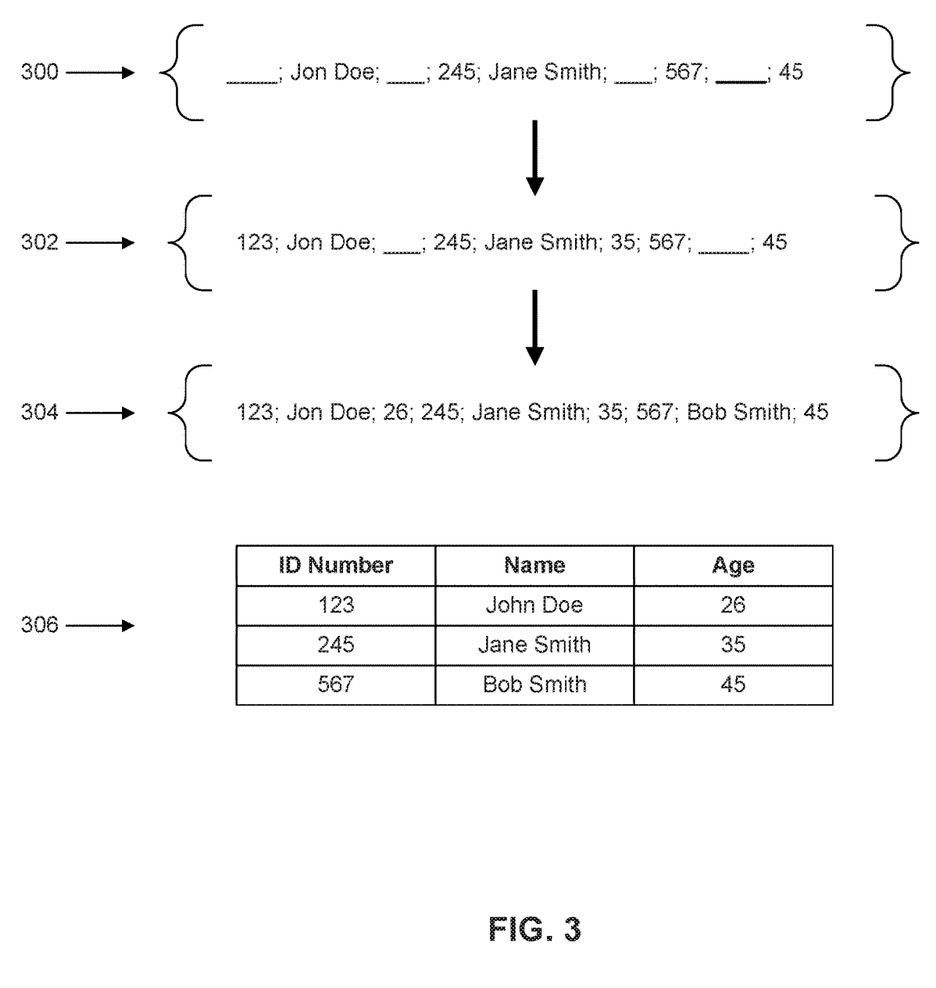
FIG. 3 illustrates example data structures according to an embodiment.

FIG. 3 illustrates example data structures according to an embodiment. As described above, while executing a function using multi-coring, the function completes the tasks asynchronously. In this regard, the function returns and/or outputs data asynchronously. The function may return and/or output values in a data frame data structure. A data frame data structure is a two dimensional data structure, where data is aligned in a tabular fashion in rows and columns. The data may be associated to a key value pair. The execution engine (e.g., execution engine 150 as shown in FIG. 1) may receive and store the data from the function in a list data structure. A list data structure is a one dimensional changeable ordered sequence of elements. As the execution engine may receive the data asynchronously, the execution engine maintains a desired order so that the data in the list data structure can be accurately transposed to a data frame data structure.

As a non-limiting example, the deployment system (e.g., deployment system 100 as shown in FIG. 1) may deploy a function using multi-coring which preforms the tasks of retrieving account holder IDs, names, and ages. Each respective account holder ID, name, and age can be tied to a single account. As the function is executed, the execution engine starts receiving output data from the function as the function completes the respective tasks asynchronously. The execution engine stores the output data in a list data structure 300. List data structure 300 may include the account holder name of "Jon Doe." However, it may be missing the respective account holder ID number and age. List data structure 300 may further include account holder ID number of "245" and account holder name of "Jane Smith", however, the data structure may be missing the age of "Jane Smith". List data structure 300 may further include account holder ID number of 567 and account holder age of 45, however, it may be missing the account holder name for account holder ID number of 567. As shown by list data structure 300, the execution engine may store the data in a particular order such that the account holder ID, name, and age that are tied to the same account are adjacent to one another. However, it can be appreciated that the execution engine may store the data in any specified order such that the data from the list data structure may be transposed to a data frame data structure.

List data structure 302 may store more data as the function completes more tasks. The execution engine may receive the account holder ID number for "Jon Doe" and the age for "Jane Smith". Accordingly, list data structure 302 may store the account holder ID number for "Jon Doe" and the age for "Jane Smith" in their designated positions in list data structure 302.

As the function completes its final tasks, the execution engine may receive the age for "Jon Doe" and the name for account holder ID "567". Accordingly, list data structure 304 may store the age for "Jon Doe" and the name for account holder "567" in their designated position in list data structure 304.

Once the function has completed all of its tasks, the execution engine may determine list data structure 304 is complete. The execution engine may then transpose the values of list data structure 304 into a data frame data structure 306. As a non-limiting example, data frame data structure 306 may be set up to include three rows and three columns. The first column may store account holder ID numbers, the second column can store account holder names, and the third column can store account holder ages. The account holder ID number may be the key value pair. The execution engine transposes the value in the order maintained by list data structure 304. For example, account holder ID number "123", account holder name "Jon Doe", and account holder age "26" are transposed into the first row; holder ID number "245", account holder name "Jane Smith", and account holder age "35" are transposed into the second row; and holder ID number "567", account holder name "Bob Smith", and account holder age "45" are transposed into the third row. Data frame data structure 306 may store the data in the desired order, such that information for each separate account is stored in a single row.

Figure 4:
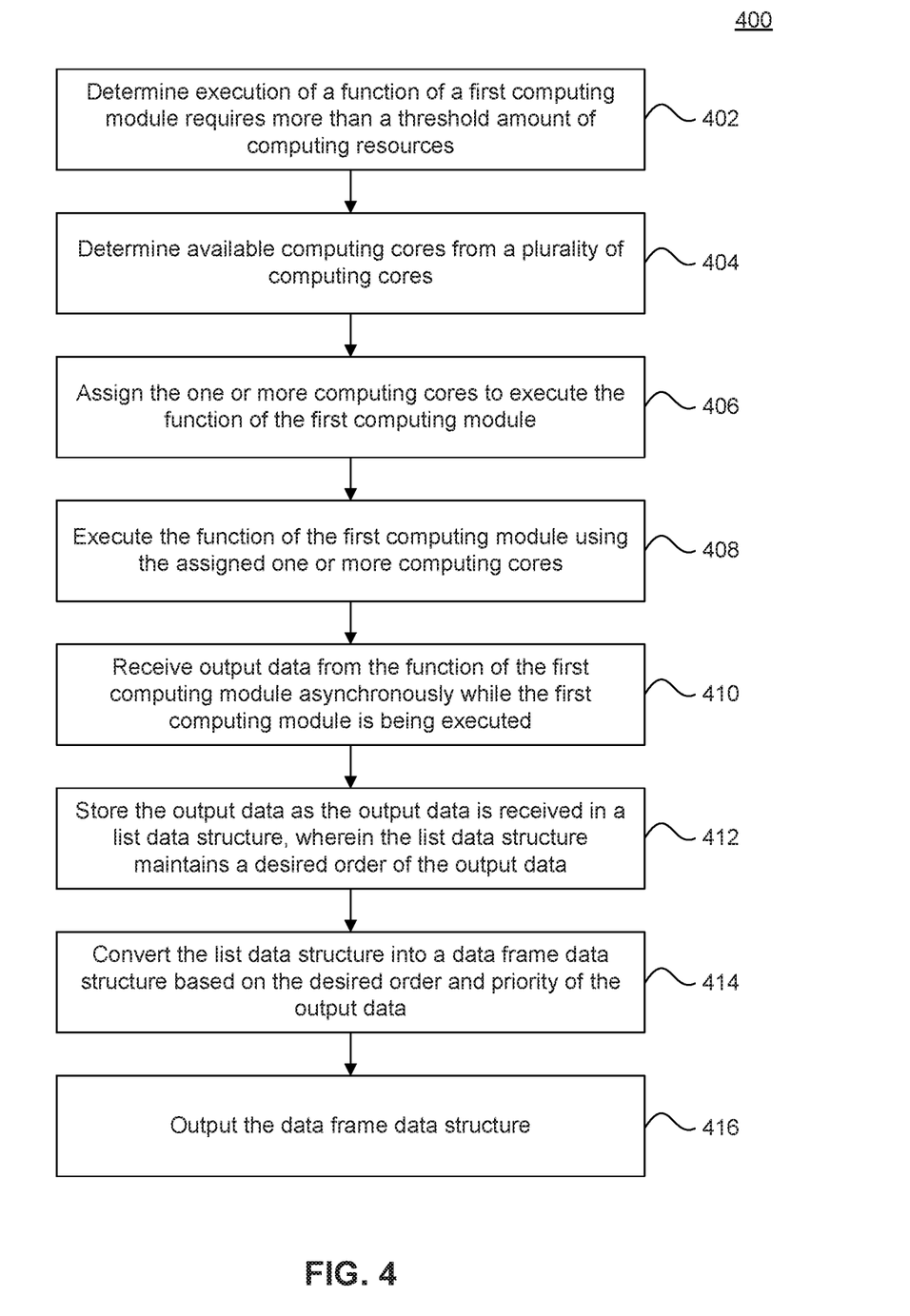
FIG. 4 is a flowchart illustrating a process for executing a computing module using multi-coring according to an embodiment.

FIG. 4 is a flowchart 400 illustrating a method for executing a computing module according to an embodiment.

Flowchart 400 starts at operation 402. In operation 402, a deployment system may determine execution of a function of a first computing module requires more than a threshold amount of computing resources. Computing resources may include memory, CPU power, storage space, and/or the like. The function of the first computing module may be code to be executed. The deployment system may determine execution of the function is computationally expensive based on an expected amount data to be processed by the function multiplied by an expected amount of calculations to be executed by the function.

In operation 404, an execution engine may determine available computing cores. The execution engine may identify the available computing cores from a pool of computing cores. Each computing core can be a separate processing unit.

In operation 406, the execution engine may assign the one or more computing cores to execute the function of the first computing module.

In operation 408, the execution engine may execute the function of the first computing module using the assigned one or more computing cores. The assigned one or more computing cores are dedicated to executing the function of the first computing module. The execution engine may transmit a call to the assigned one or more computing cores. The call may include instructions to the assigned one or more computing cores to execute the function asynchronously. The call may further include arguments required by the function to perform the tasks of the function. The call may further include a different call to a function for converting a data frame data structure to be output by the function to a list data structure.

In operation 410, the execution engine may receive output data from the function of the first computing module asynchronously while the function of the first computing module is being executed. Each of the tasks of the function may be executed asynchronously. For example, the function may include task 1; task 2; and task 3, and task 1, task 2, and task 3 may be executed concurrently by the assigned computing cores. The assigned computing cores may execute different tasks of the function irrespective of their order within the function. The function may output data in response to completing a task irrespective of the order of the task in the function. In the event task 3 is completed before task 1, the function will output the result of task 3 before task 1.

In operation 412, the execution engine may store the output data as the output data is received in a list data structure as described with respect to operation 408. As the data is being received asynchronously, the list data structure maintains a desired order of the output data.

In operation 414, the execution engine may convert the list data structure into a data frame data structure based on the desired order and priority of the output data. The list may be a one-dimensional data structure and the data frame data structure may be a two dimensional data structure. The execution engine may transpose the output data from the list data structure to the data frame data structure. The execution engine may ensure the data is transposed from the list to the data frame in the desired order.

In operation 416, the deployment system may output the data frame data structure. The data frame data structure may be output to a user device. Alternatively, the data frame data structure may be output to a different sub-computing system within a distributed and/or cloud computing environment, for further processing.

Figure 5:
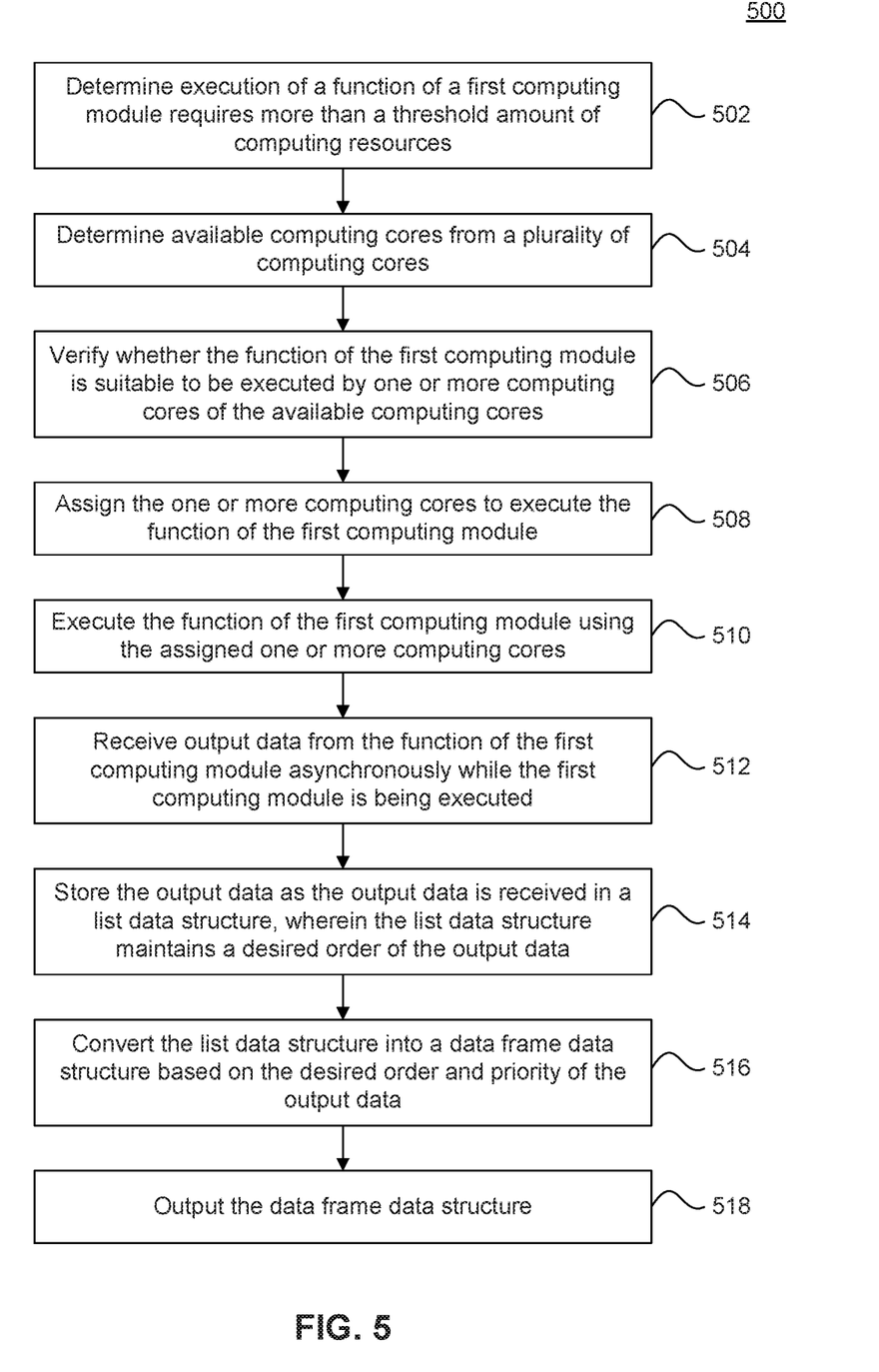
FIG. 5 is a flowchart illustrating a process for verifying a computing module is suitable for multi-coring according to an embodiment.

FIG. 5 is a flowchart 500 illustrating a process for verifying a computing module is suitable for multi-coring according to an embodiment.

Flowchart 500 starts at operation 502. In operation 502, a deployment system may determine execution of a function of a first computing module requires more than a threshold amount of computing resources. Computing resources may include memory, CPU power, storage space, and/or the like.

In operation 504, the deployment system may determine available computing cores.

In operation 506, the deployment system may verify whether the function of the first computing module is suitable to be executed by one or more computing cores of the available computing cores. In determining whether the function of the first computing module is suitable by the one or more computing cores of the available computing cores the deployment system determines whether the function is suitable to be executed using multi-coring. As described above, multi-coring is dedicating one or more computing cores to execute the function. The deployment system may determine a function is suitable for multi-coring based on the amount of data to be processed multiplied by the calculations to be executed by the function being below a threshold amount, the function not including any interdependent calculations, and the function not having any interdependencies with other functions.

In operation 508, in response to verifying the function of the first computing module is suitable to be executed by the one or more computing cores of the available computing cores, the deployment system may assign the one or more computing cores to execute the function of the first computing module.

In operation 510, the deployment system may execute the function of the first computing module using the assigned one or more computing cores. The assigned one or more computing cores are dedicated to executing the function of the first computing module.

In operation 512, the deployment system may receive output data from the function of the first computing module asynchronously while the first computing module is being executed.

In operation 514, the deployment system may store the output data as the output data is received in a list data structure, wherein the list data structure maintains a desired order of the output data.

In operation 516, the deployment system may convert the list data structure into a data frame data structure based on the desired order and priority of the output data.

In operation 518, the deployment system may output the data frame data structure.

Figure 6:
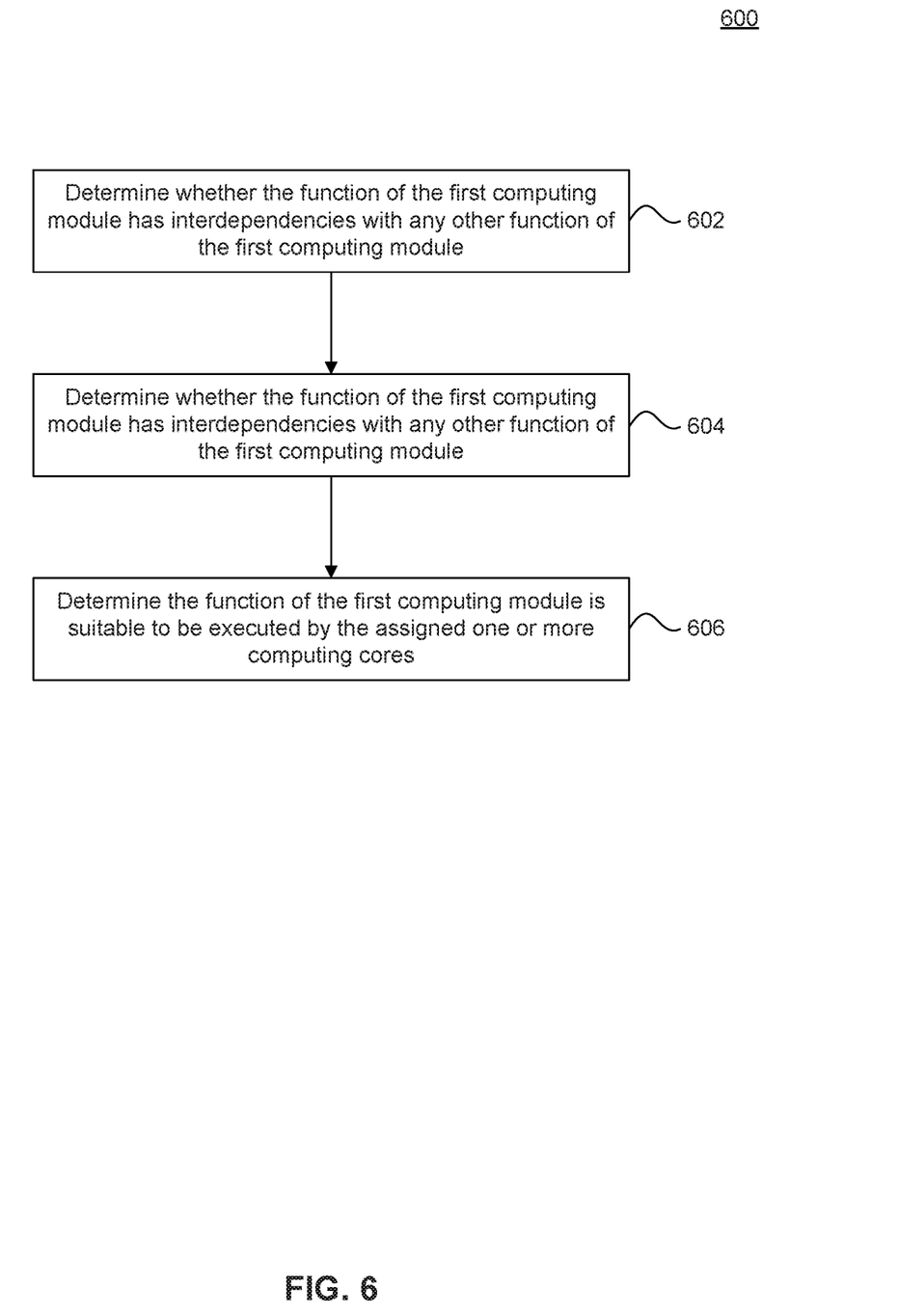
FIG. 6 is a flowchart illustrating a process for verifying a computing module is suitable for multi-coring according to an embodiment.

FIG. 6 is a flowchart 600 illustrating a process for verifying a computing module is suitable for multi-coring according to an embodiment.

Flowchart 600 starts with operation 602. In operation 602, a deployment system may determine whether the function of the first computing module includes interdependencies between calculations executed in the function of the first computing module. As the tasks of the function are completed asynchronously, calculations of the function are executed out of the intended order. In this regard, there cannot be interdependencies between calculations when executing the function using multi-coring, as the assigned computing cores may attempt to execute a second calculation without waiting for the result of the first calculation. If the second calculation includes a variable or value to be calculated by the first calculation, executing the second calculation before the completion of the first calculation may cause an error.

In operation 604, the deployment system may determine whether the function of the first computing module has interdependencies with any other function of the first computing module. As stated above, in multi-coring tasks of the function are executed asynchronously. Therefore, while using multi-coring the function may not rely on different function calls as the tasks are not completed in the intended order.

In operation 606, in response to determining the function of the first computing module is void of interdependencies between calculations executed in the function of the first computing module or other functions of the first computing module, the deployment system may determine that the first computing module is suitable for execution on the assigned one or more computing cores. In the event the deployment system may determine execution of more than one function requires more than the threshold amount of computing resources or the function interdependent calculations or have interdependencies with another function, the deployment system may execute the first and second functions of the second computing module, in parallel, using any one of the available computing cores.

Figure 7:
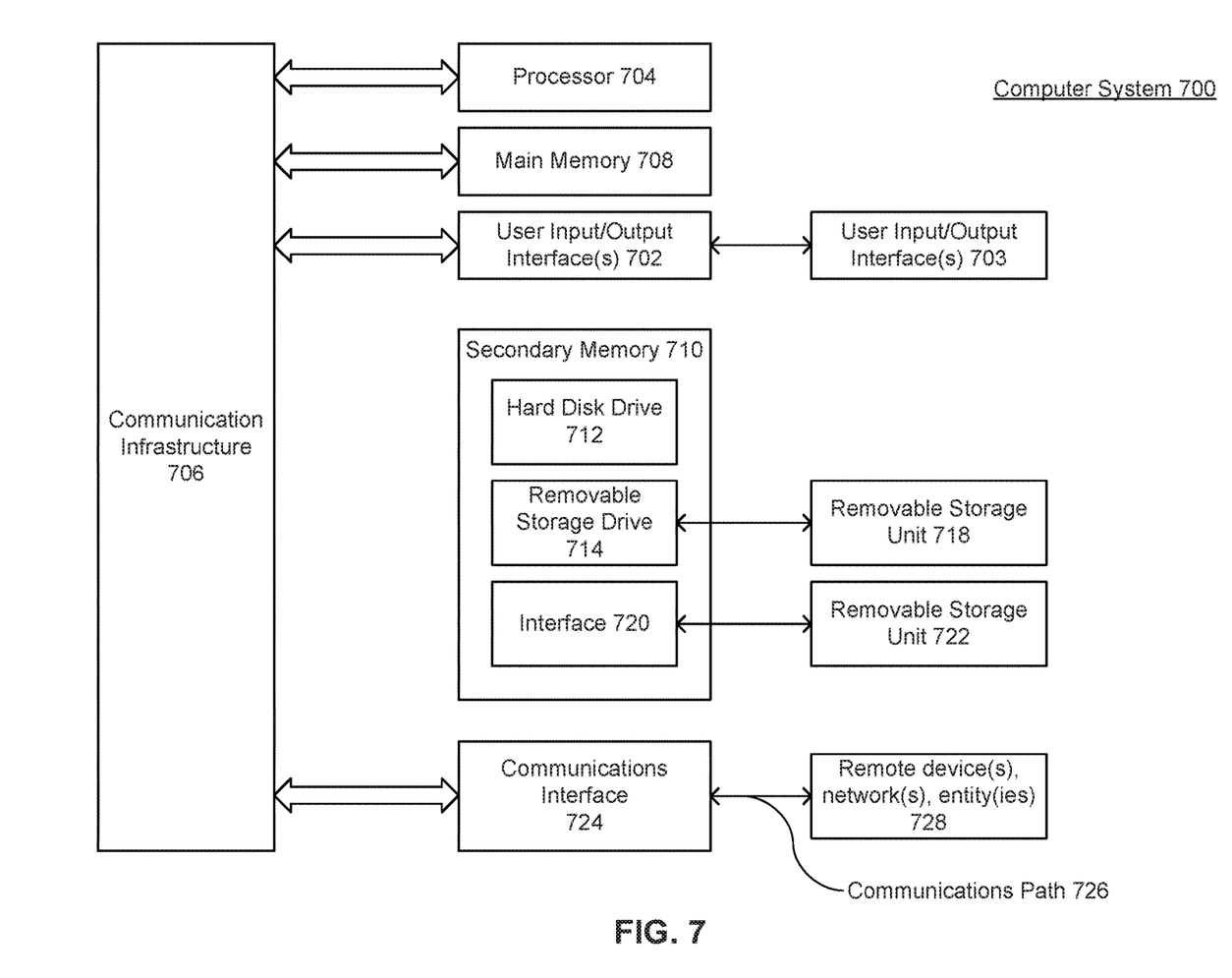
FIG. 7 is a block diagram of example components of device according to an embodiment.

FIG. 7 is a block diagram of example components of computer system 700. One or more computer systems 700 may be used, for example, to implement any of the embodiments discussed herein, as well as combinations and subcombinations thereof. Computer system 700 may include one or more processors (also called central processing units, or CPUs), such as a processor 704. Processor 704 may be connected to a communication infrastructure or bus 707.

Computer system 700 may also include user input/output interface(s) 702, such as monitors, keyboards, pointing devices, etc., which may communicate with communication infrastructure 707 through user input/output interface(s) 702.

One or more of processors 704 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 700 may also include a main or primary memory 708, such as random access memory (RAM). Main memory 708 may include one or more levels of cache. Main memory 708 may have stored therein control logic (i.e., computer software) and/or data.

Computer system 700 may also include one or more secondary storage devices or memory 710. Secondary memory 710 may include, for example, a hard disk drive 712 and/or a removable storage drive 714.

Removable storage drive 714 may interact with a removable storage unit 718. Removable storage unit 718 may include a computer usable or readable storage device having stored thereon computer software (control logic) and/or data. Removable storage unit 718 may be a program cartridge and cartridge interface (such as that found in video game devices), a removable memory chip (such as an EPROM or PROM) and associated socket, a memory stick and USB port, a memory card and associated memory card slot, and/or any other removable storage unit and associated interface. Removable storage drive 714 may read from and/or write to removable storage unit 718.

Secondary memory 710 may include other means, devices, components, instrumentalities or other approaches for allowing computer programs and/or other instructions and/or data to be accessed by computer system 700. Such means, devices, components, instrumentalities or other approaches may include, for example, a removable storage unit 722 and an interface 720. Examples of the removable storage unit 722 and the interface 720 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 700 may further include a communication or network interface 724. Communication interface 724 may enable computer system 700 to communicate and interact with any combination of external devices, external networks, external entities, etc. (individually and collectively referenced by reference number 728). For example, communication interface 724 may allow computer system 700 to communicate with external or remote devices 728 over communications path 726, which may be wired and/or wireless (or a combination thereof), and which may include any combination of LANs, WANs, the Internet, etc. Control logic and/or data may be transmitted to and from computer system 700 via communication path 726.

Computer system 700 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 700 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 700 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 700, main memory 708, secondary memory 710, and removable storage units 718 and 722, as well as tangible articles of manufacture embodying any combination of the foregoing. Such control logic, when executed by one or more data processing devices (such as computer system 700), may cause such data processing devices to operate as described herein.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method for executing a computing module, the method comprising:
    determining, by one or more computing devices, execution of a function of a first computing module requires more than a threshold amount of computing resources;
    determining, by the one or more computing devices, available computing cores from a plurality of computing cores;
    verifying, by the one or more computing devices, whether the function of the first computing module is executable by one or more available computing cores based on a relationship between calculations in the first computing module or a relationship between the function and another function in the first computing module;
    assigning, by the one or more computing devices, one or more of the available computing cores to execute the function of the first computing module;
    executing, by the one or more computing devices, the function of the first computing module using the assigned one or more computing cores, wherein the assigned one or more computing cores are dedicated to executing the function of the first computing module, wherein tasks included in the function are executed asynchronously;
    receiving, by the one or more computing devices, output data in a first instance of a data frame data structure from the function of the first computing module asynchronously while the function of the first computing module is being executed, wherein the first instance of the data frame structure is a two-dimensional data structure and stores the output data in an incorrect order;
    identifying, by the one or more computing devices, a key-value pair and desired order of the output data;
    transposing, by the one or more computing devices, the output data of the first instance of the data frame data structure into a list data structure, as the output data is received by the first instance of the data frame data structure, wherein the list data structure is a one-dimensional data structure and the output data is positioned in the list data structure based on the key-value pair and desired order;
    converting, by the one or more computing devices, the list data structure into a second instance of a data frame data structure based on the key-value pair and desired order of the output data, wherein the second instance of the data frame data structure stores the output data in the desired order; and
    outputting, by the one or more computing devices, the data frame data structure.

2. The method of claim 1, further comprising:
    determining, by the one or more computing devices, execution of a first and second function of a second computing module requires more than the threshold amount of computing resources; and
    executing, by the one or more computing devices, the first and second functions of the second computing module, in parallel, using any one of the available computing cores other than the one or more computing cores assigned to execute the function of the first computing module.

3. The method of claim 1, wherein determining whether execution of the function of the first computing module requires more than the threshold amount of computing resources further comprises:
    determining, by the one or more computing devices, an amount of data processed and an amount of calculations executed by the function of the first computing module.

4. The method of claim 1, wherein maintaining the desired order of the output data includes maintaining the key-value pair for the output data.

5. The method of claim 1, further comprising:
    determining, by the one or more computing devices, the relationship between the calculations executed in the function of the first computing module is void of interdependencies; and
    in response to determining the function of the first computing module is void of interdependencies between the calculations executed in the function of the first computing module, determining, by the one or more computing devices, the function of the first computing module is executable by the assigned one or more computing cores.

6. The method of claim 1 further comprising:
    determining, by the one or more computing devices, the relationship between the function and the other function of the first computing module is void of interdependencies between the function and the other function of the first computing module; and
    in response to determining the function of the first computing module is void of interdependencies between the other function of the first computing module, determining, by the one or more computing devices, the function of the first computing module is executable by the assigned one or more computing cores.

7. The method of claim 1, wherein the converting of the list data structure into the second instance of the data frame data structure comprises:

transposing, by the one or more computing devices, the output data stored in the list data structure into the second instance of the data frame data structure based on the correct order.

8. A system for executing a computing module, the system comprising:

a memory; and a processor in communication with the memory, configured to:

determine execution of a function of a first computing module requires more than a threshold amount of computing resources;

determine available computing cores from a plurality of computing cores;

verify whether the function of the first computing module is executable by one or more computing cores of the available computing cores based on a relationship between calculations in the first computing module or a relationship between the function and another function in the first computing module;

in response to verifying the function of the first computing module is executable by the one or more computing cores of the available computing cores, assign the one or more computing cores to execute the function of the first computing module;

execute the function of the first computing module using the assigned one or more computing cores, wherein the assigned one or more computing cores are dedicated to executing the function of the first computing module, wherein tasks included in the function are executed asynchronously;

receive output data in a first instance of a data frame data structure from the function of the first computing module asynchronously while the function of the first computing module is being executed, wherein the first instance of the data frame structure is a two-dimensional data structure and stores the output data in an incorrect order;

identify a key-value pair and correct order of the output data;

transpose the output data of the first instance of the data frame data structure into a list data structure, as the output data is received by the first instance of the data frame data structure, wherein the list data structure is a one-dimensional data structure and the output data is positioned in the list data structure based on the key-value pair and correct order;

convert the list data structure into a second instance of a data frame data structure based on the key-value pair and desired order of the output data, wherein the second instance of the data frame data structure is a two-dimensional data structure and stores the output data in the correct order; and output the data frame data structure.

9. The system of claim 8, the processor further configured to:

determine execution of a first and second function of a second computing module requires more than the threshold amount of computing resources; and execute the first and second functions of the second computing module, in parallel, using any one of the available computing cores other than the one or more computing cores assigned to execute the function of the first computing module.

10. The system of claim 8, wherein in determining whether execution of the function of the first computing module requires more than the threshold amount of computing resources the processor is configured to:

determine an amount of data processed and an amount of calculations executed by the function of the first computing module.

11. The system of claim 8, wherein maintaining the desired order of the output data includes maintaining the key-value pair for the output data.

12. The system of claim 8, wherein the processor is further configured to:

determine the relationship of the calculations in the function of the first computing module is void of interdependencies; and in response to determining the function of the first computing module is void of interdependencies between the calculations executed in the function of the first computing module, determine the function of the first computing module is executable by the assigned one or more computing cores.

13. The system of claim 8, wherein the processor is further configured to:

determine the relationship between the function and the other function of the first computing module is void of interdependencies; and in response to determining the function of the first computing module is void of interdependencies between the other function of the first computing module, determine the function of the first computing module is executable by the assigned one or more computing cores.

14. The system of claim 8, wherein when converting the list data structure into the second instance of the data frame data structure the processor is configured to:

transpose the output data stored in the list data structure into the second instance of the data frame data structure based on the correct order.

15. A non-transitory computer readable medium having instructions stored thereon, execution of which, by one or more processors, cause the one or more processors to perform operations comprising:

determining execution of a function of a first computing module requires more than a threshold amount of computing resources based on an amount of data processed by the function of the first computing module and an amount of calculations executed by the function of the first computing module;

determining available computing cores from a plurality of computing cores;

verifying whether the function of the first computing module is executable by one or more computing cores of the available computing cores based on a relationship between calculations in the first computing module or a relationship between the function and another function in the first computing module;

in response to verifying the function of the first computing module is executable by the one or more computing cores of the available computing cores, assigning the one or more computing cores to execute the function of the first computing module;

executing the function of the first computing module using the assigned one or more computing cores, wherein the assigned one or more computing cores are dedicated to executing the function of the first computing module, wherein tasks included in the function are executed asynchronously;

receiving output data in a first instance of a data frame data structure from the function of the first computing module asynchronously while the function of the first computing module is being executed, wherein the first instance of the data frame structure is a two-dimensional data structure and stores the output data in an incorrect order;

identifying a key-value pair and desired order of the output data;

transposing the output data of the first instance of the data frame data structure into a list data structure, as the output data is received by the first instance of the data frame data structure, wherein the list data structure is a one-dimensional data structure and the output data is positioned in the list data structure based on the key-value pair and desired order;

converting the list data structure into a second instance of a data frame data structure based on the key-value pair and desired order of the output data, wherein the second instance of the data frame data structure is a two-dimensional data structure and stores the output data in the desired order; and outputting the data frame data structure.

16. The non-transitory medium of claim 15, the operations further comprising:

determining execution of a first and second function of a second computing module requires more than the threshold amount of computing resources;

executing the first and second functions of the second computing module, in parallel, using any one of the available computing cores other than the one or more computing cores assigned to execute the function of the first computing module.

17. The non-transitory medium of claim 16, wherein when converting the list data structure into the second instance of the data frame data structure the operations further comprising:

transposing the output data stored in the list data structure into the second instance of the data frame data structure based on the correct order.

18. The non-transitory medium of claim 15, the operations further comprising:

determining the relationship of the calculations in the function of the first computing module is void of interdependencies; and in response to determining the function of the first computing module is void of interdependencies between calculations executed in the function of the first computing module, determining the function of the first computing module is executable by the assigned one or more computing cores.

19. The non-transitory medium of claim 15, the operations further comprising:

determining the relationship between the function and the other function of the first computing module is void of interdependencies; and in response to determining the function of the first computing module is void of interdependencies between the other function of the first computing module, determining the function of the first computing module is executable by the assigned one or more computing cores.

* * * * *